United States Patent
Hojdis et al.

(10) Patent No.: US 11,952,494 B2
(45) Date of Patent: Apr. 9, 2024

(54) SULFUR-CROSSLINKABLE RUBBER MIXTURE, VULCANIZATE OF THE RUBBER MIXTURE, AND VEHICLE TIRE

(71) Applicant: Continental Reifen Deutschland GmbH, Hannover (DE)

(72) Inventors: Nils Hojdis, Wuppertal (DE); Carla Recker, Hannover (DE); Michael Wark, Oldenburg (DE); Hendrik Multhaupt, Oldenburg (DE)

(73) Assignee: Continental Reifen Deutschland GmbH, Hannover (DE)

( * ) Notice: Subject to any disclaimer, the term of this patent is extended or adjusted under 35 U.S.C. 154(b) by 44 days.

(21) Appl. No.: 16/652,112

(22) PCT Filed: Jul. 23, 2018

(86) PCT No.: PCT/EP2018/069853
§ 371 (c)(1),
(2) Date: Mar. 30, 2020

(87) PCT Pub. No.: WO2019/072431
PCT Pub. Date: Apr. 18, 2019

(65) Prior Publication Data
US 2020/0308372 A1    Oct. 1, 2020

(30) Foreign Application Priority Data
Oct. 10, 2017  (EP) .................................... 17195625

(51) Int. Cl.
*C08L 9/00*     (2006.01)
*B60C 1/00*     (2006.01)
(Continued)

(52) U.S. Cl.
CPC .............. *C08L 9/00* (2013.01); *B60C 1/0025* (2013.01); *C08K 3/013* (2018.01); *C08K 3/04* (2013.01);
(Continued)

(58) Field of Classification Search
CPC .. C08L 9/00; C08K 3/013; C08K 3/04; C08K 11/005; C08K 2201/006
(Continued)

(56) References Cited

U.S. PATENT DOCUMENTS

| 2010/0101142 A1 | 4/2010 | Eisner et al. |
| 2011/0028257 A1* | 2/2011 | Sealey ..................... F16G 5/04 474/263 |

(Continued)

FOREIGN PATENT DOCUMENTS

| DE | 10 2016 201 801 | * | 5/2017 |
| DE | 102016201801 A1 | | 5/2017 |

(Continued)

OTHER PUBLICATIONS

Machine translation of DE 10 2016 201 801 (Year: 2017).*
(Continued)

*Primary Examiner* — Doris L Lee
(74) *Attorney, Agent, or Firm* — Richard A. Wolf; Gregory J. Adams

(57) ABSTRACT

The invention relates to a sulfur-crosslinkable rubber mixture, to the vulcanizate thereof, and to a vehicle tire. The rubber mixture according to the invention comprises at least the following constituents: at least one diene rubber; and, at least one char (HTC char) obtained by hydrothermal carbonization of at least one starting substance. A vehicle tire according to the invention comprises at least one vulcanizate according to the invention of the rubber mixture in at least one component.

16 Claims, 2 Drawing Sheets

(51) Int. Cl.
*C08K 3/013* (2018.01)
*C08K 3/04* (2006.01)
*C08K 3/36* (2006.01)
*C08K 11/00* (2006.01)
*C10L 9/08* (2006.01)
*C08K 3/16* (2006.01)
*C10B 53/02* (2006.01)
*C10B 57/06* (2006.01)

(52) U.S. Cl.
CPC .............. *C08K 3/36* (2013.01); *C08K 11/005* (2013.01); *C10L 9/086* (2013.01); *C08K 2003/168* (2013.01); *C08K 2201/006* (2013.01); *C08L 2312/00* (2013.01); *C10B 53/02* (2013.01); *C10B 57/06* (2013.01)

(58) Field of Classification Search
USPC ........................................................ 523/155
See application file for complete search history.

(56) References Cited

U.S. PATENT DOCUMENTS

| | | | |
|---|---|---|---|
| 2013/0004408 A1* | 1/2013 | Dua | C01B 32/324 423/445 R |
| 2013/0131240 A1 | 5/2013 | Uekita et al. | |
| 2018/0334568 A1 | 11/2018 | Lahtinen et al. | |
| 2018/0340074 A1* | 11/2018 | Wittmann | C08K 3/04 |
| 2020/0239697 A1 | 7/2020 | Wittmann et al. | |

FOREIGN PATENT DOCUMENTS

| | | |
|---|---|---|
| EP | 2134821 A1 | 12/2009 |
| EP | 2474591 A1 | 7/2012 |
| EP | 2589619 A1 | 5/2013 |
| EP | 3053929 A1 | 8/2016 |
| EP | 3243877 A1 | 11/2017 |
| JP | 2013-124346 * | 6/2013 |
| WO | 9909036 A1 | 2/1999 |
| WO | 2008083241 A2 | 7/2008 |
| WO | 2008083242 A1 | 7/2008 |
| WO | 2008083243 A1 | 7/2008 |
| WO | 2008083244 A1 | 7/2008 |
| WO | 2008095589 A1 | 8/2008 |
| WO | 2009127727 A1 | 10/2009 |
| WO | 2010006881 A1 | 1/2010 |
| WO | 2010043562 A1 | 4/2010 |
| WO | 2010112230 A1 | 10/2010 |
| WO | 2014096544 A1 | 6/2014 |
| WO | 2017085278 A1 | 5/2017 |
| WO | WO 2017/085278 * | 5/2017 |

OTHER PUBLICATIONS

Machine translation of JP 2013-124346 (Year: 2013).*
International Search Report of PCT application PCT/EP2018/069853 on which this application is based.
"Salt Templating": A Simple and Sustainable Pathway toward Highly Porous Functional Carbons from Ionic Liquids—Nina Fechler, Tim-Patrick Fellinger, and Markus Antonietti—pp. 75-79.
Journal of Materials Chemistry A—Salt and Sugar: direct synthesis of high surface area carbon materials at low temperatures via hydrothermal carbonization of glucose under hypersaline conditions—pp. 9418-9421.
Koottatep Thammarat et al. / Sludge stabilization and energy recovery by hydrothermal carbonization process / Jun. 7, 2016.
Deutsches Biomasseforschungszentrum / Biobasierte hydrothermale Prozesse-Technologien zur stofflichen und energetischen Nutzung (2021Q06806)—Cited in NPL No. 4.
Analyse des Trinkwasser aus dem Versorgungswerk Ludwigsfelde aus 2015—probestelle: WW Ludwigsfelde / Durchschnittswerte der Prüfparameter (2021Q06807)—Cited in NPL No. 4.
S. Jyan Teh, S. Bee Abdul Hamid, C. Wei Lai, Y. Sing Lim / ZnCl2_NaCl-Catalysed Hydrothermal Carbonization of Glucose and Oil Palm Shell Fiber, 2015, 7, 611-615 (2021Q06805)—Cited in NPL No. 4.
Opposition filed in the court-part case 17195625.3 on Oct. 14, 2021.

* cited by examiner

SULFUR-CROSSLINKABLE RUBBER MIXTURE, VULCANIZATE OF THE RUBBER MIXTURE, AND VEHICLE TIRE

The invention relates to a sulfur-crosslinkable rubber mixture, to the vulcanizate thereof, and to a vehicle tire.

It is known that different reinforcing (active) or inactive fillers are employed in rubber mixtures of tires. This is intended to optimize the properties of the tire, for example rolling resistance, abrasion characteristics or grip properties. The reinforcing fillers include in particular carbon blacks and silicas. Inactive fillers comprise a multiplicity of inorganic substances, such as especially silicates, calcium carbonates. Carbon blacks are based on carbon and are very largely obtained from the raw materials, natural gas, crude oil or coal tar products. This brings about a dependence on finite natural, fossil resources. The cracking of the hydrocarbons to afford the useful reactants is, furthermore, carried out thermally using a great deal of energy and this is reflected in high process costs. The majority is produced by incomplete combustion by the furnace process which forms inter alia the toxic gas carbon monoxide.

The present invention accordingly has for its object to provide a sulfur-crosslinkable rubber mixture which contains a substitute filler for carbon black based on renewable raw materials and is also suitable for use in vehicle tires. For this purpose, the rubber mixture should have an improved stiffness in comparison with an unfilled rubber mixture, i.e. a rubber mixture without filler.

The object is achieved when the sulfur-crosslinkable rubber mixture comprises at least the following constituents:
- at least one diene rubber;
- at least one char (HTC char) obtained by hydrothermal carbonization of at least one starting substance.

The invention has the advantage that, as elucidated hereinbelow, unlike carbon blacks HTC char is not produced from fossil raw materials and the process for its production is comparatively environmentally friendly. Production of the HTC char does not produce any additional carbon dioxide as a consequence of the reaction, and this has a positive effect on otherwise ever-increasing global $CO_2$ emissions. The low reaction temperature and the option of recycling the process water generated result in lower process costs. This makes it possible to employ renewable raw materials as fillers in rubber mixtures, thus making the rubber mixtures "greener". This is coupled with a reinforcing of the rubber mixture compared to unfilled rubber mixtures. The HTC char thus acts as a reinforcing filler.

The abbreviation "HTC" stands for hydrothermal carbonization as is known in the prior art. This comprises heating at least one starting substance together with water in a sealed pressure- and heat-resistant apparatus, such as especially an autoclave. The starting mixture is thus a suspension and/or solution of the starting substance(s) in water. The heating and the thus-produced steam produces an elevated pressure which is dependent especially on the temperature and the fill level of the apparatus. In hydrothermal carbonization, the process that leads to the formation of lignite in nature over millions of years is imitated within a short time, usually a few hours. "HTC char" is to be understood as meaning the solid which is the product of hydrothermal carbonization. The terms "hydrochar" or "char" are also used in the context of the present invention.

Possible processes are described for example in EP 2134821 A1, EP 2474591 A1, WO 2000 9127721 A1 and WO 2010 006881 A1.

Any HTC char is suitable as a filler for the rubber mixture according to the invention in principle. Described hereinbelow are advantageous HTC chars more particularly described in terms of their properties and/or their production process.

In an advantageous development of the invention at least one salt is added to the mixture of starting substance and water in the pressure- and heat-resistant apparatus in the hydrothermal carbonization. The use of at least one salt surprisingly achieves better properties of the HTC char, said char then likewise resulting in improved properties in the rubber mixture. The rigidity of the rubber mixture is in particular further increased. HTC char produced using at least one salt thus has a greater reinforcing effect in the rubber mixture. It has been found that such an HTC char has a comparatively high surface area coupled with optimized surface roughness and functionality. Addition of the salt simultaneously brings about an increase in the carbon content of the obtained char.

Carbon blacks well known as fillers for tire mixtures have a carbon content of about 99% by weight. When using chars instead of carbon blacks it is desirable to employ a char having the highest possible carbon content to achieve a level of properties of the rubber mixtures that is as comparable as possible. Biomasses have a carbon content of about 40% by weight. HTC chars produced without salts have a carbon content of about 50% by weight while HTC chars produced using at least one salt have an elevated carbon content of about 60% by weight.

In the context of the present invention "salt" is to be understood as meaning any salt which catalyzes the decomposition of the starting substances, in particular of the biomasses and/or their decomposition products, to form char. Preferentially suitable therefor are metal salts, i.e. inorganic salts. It is preferable when at least one metal halide, particularly preferably at least one metal chloride, is concerned.

When using at least one salt in the hydrothermal carbonization the weight ratio of salt to starting substance is preferably 100:0.1 to 0.1:100, particularly preferably 0.1:2 to 2:0.1. In a very particularly preferred embodiment of the invention the weight ratio of salt to starting substance is 0.3 to 3.0:1, preferably in turn 0.7 to 2.5:1, particularly preferably in turn 0.7 to 1.5:1, for example 1.2:1.

It is not necessary for the entirety of the employed salt to be dissolved in the surrounding water. It is also possible for the salt to be completely or partially undissolved. It thus preferably has a melting point corresponding to the reaction temperature in the HTC process, i.e. for example in the range from 170° C. to 230° C.

In an advantageous embodiment of the invention it is also possible to employ a salt mixture having a melting point that is reduced compared to the pure salts (eutectic mixture).

The weight ratio of salt mixture to starting substance would preferably be in the above described ranges and as is known to those skilled in the art the composition of the different salts in the mixture may be adjusted via the molar ratio and is in the range of a eutectic ratio for example.

In an advantageous embodiment of the invention the at least one salt is at least $ZnCl_2$. An HTC char resulting in particularly good properties of the rubber mixture is obtained especially when using $ZnCl_2$.

In an advantageous embodiment of the invention only $ZnCl_2$ is used as the salt, thus resulting in very good properties of the rubber mixture.

Even when using a eutectic salt mixture it is preferable when one of the salts is $ZnCl_2$.

In a further advantageous embodiment of the invention the at least one salt used is a salt selected from the group consisting of LiCl, NaCl and KCl. KCl is particularly preferred. The use of the recited salts, preferably KCl, also results in improved properties of the rubber mixture.

In a further advantageous embodiment of the invention $ZnCl_2$ and at least one salt from the group consisting of LiCl, NaCl and KCl are used in the mixture. A mixture of $ZnCl_2$ and a salt selected from the group consisting of LiCl, NaCl and KCl is thus a preferred salt mixture in the context of the present invention. The molar proportions of XCl (where X=Li, Na or K) to $ZnCl_2$ may be from 1% XCl and 99% $ZnCl_2$ up to 99% XCl and 1% $ZnCl_2$.

A mixture of $ZnCl_2$ and KCl is a particularly preferred salt mixture and the recited molar proportions are conceivable. For example, a mixture of 50 mol % $ZnCl_2$ and 50 mol % KCl may be used. As described, it is possible, for example, to use a eutectic mixture of $ZnCl_2$ and KCl which comprises 45 mol % KCl and 55 mol % $ZnCl_2$. This corresponds to a weight ratio of KCl to $ZnCl_2$ of 1 to 2.2.

The salt or the salt mixtures may be provided by producing aqueous solutions of the salts in the desired molar ratios. However, the salt or the salt mixtures may also be added to the relevant starting substances, for example moist biomasses, in undissolved or partially dissolved form.

In the context of the present invention the "surface area" of the HTC char is to be understood as meaning the nitrogen surface area (BET surface area according to DIN ISO 9277, calculated via the Brunauer-Emmett-Teller (BET) isotherm).

It is preferable when the HTC char present in the rubber mixture according to the invention has a BET surface area of 1 to 3000 $m^2/g$, particularly preferably 50 to 3000 $m^2/g$, very particularly preferably 50 to 1000 $m^2/g$, preferably in turn 50 to 300 $m^2/g$, particularly preferably in turn 50 to 200 $m^2/g$, very particularly preferably in turn 50 to 150 $m^2/g$.

Thus, the invention comprises HTC chars having a comparatively low BET surface area, for example HTC chars that are produced without use of a salt and predominantly have a BET surface area in the range from 1 to 49 $m^2/g$. It likewise comprises HTC chars having a comparatively high surface area. Activated HTC chars have a BET surface area of 500 to 1000 $m^2/g$ for example. An HTC char produced using at least one salt preferably has a BET surface area of 20 to 200 $m^2/g$, particularly preferably 30 to 200 $m^2/g$, very particularly preferably 50 to 200 $m^2/g$, in particular 80 to 200 $m^2/g$, especially preferably 90 to 140 $m^2/g$, and in a particularly advantageous embodiment of the invention is present in the rubber mixture.

An HTC char produced using at least one salt further has an increased surface roughness and an optimized surface functionality. The surface roughness may be qualitatively assessed using TEM images by way of comparison as elucidated hereinbelow in the examples.

The surface functionality may be determined by evaluating FTIR spectra. "FTIR" is an acronym for Fourier-transform infrared. As is known to those skilled in the art, FTIR spectra allow different chemical bonds to be characterized on account of their different absorption bands (different vibration behavior).

In the context of the present invention "surface functionality" is to be understood as meaning that the char has functional groups especially at its surface. The functional groups are organic functional groups constructed from carbon and oxygen and optionally further heteroatoms, such as nitrogen, sulfur or halides, such as especially Cl.

Carbon-oxygen-containing functional groups are especially alcohols —C—OH and groups having carbonyl compounds C=O, for example ketones $R_2C$=O, aldehydes RHC=O, carboxyl groups RC(=O)OH, esters —C(=O)OR, wherein R are generally radicals which may be organic and may comprise heteroatoms or may represent heteroatoms.

As is known in the prior art chars may be activated by exposing the initially produced chars to steam to liberate pores and thus increase the free surface area. This also has the disadvantages that the described functional groups are removed from the surface and that activation entails an additional process step which is time- and energy-intensive. One advantage of the present invention is that the HTC chars of the rubber mixture need not be activated to achieve good properties, in particular in respect of reinforcement. This applies especially to the HTC chars produced using at least one salt.

HTC chars, in particular those produced using at least one salt, provide a good compromise between the size of the surface area and the functionality and are very well suited as fillers for rubber mixtures, in particular for vehicle tires.

In one advantageous embodiment of the invention at least one biomass and/or the degradation product(s) thereof are used as a starting substance. The biomasses may be any conceivable biomasses, especially those generated as waste. Moist or dry biomasses may be concerned. Moist biomasses are for example sewage sludge, animal waste, or other moist waste products, especially agricultural waste products. Dry biomasses include all conceivable wastes composed of husks, timbers, shrubs and plants.

In a hydrothermal carbonization, a suitable amount of water is added to the respective biomass depending on the water content already present and it is also conceivable for a moist biomass to be used directly without water addition.

In advantageous embodiments, the biomass is selected from the group comprising, preferably consisting of, cereal husks (for example rice husks), nut husks, fruit husks (for example coconut husks), green waste, wood wastes such as sawdust, and algae. Green waste comprises all plants, including bushes, flowers, weeds, such as dandelion.

The term "decomposition products" is to be understood as meaning all substances and substance mixtures which are formed by complete or partial decomposition of biomasses and may still be converted into char.

In advantageous embodiments at least one starting substance is selected from the group consisting of lignin, cellulose, hemicellulose and sugar, especially glucose. These substances may be generated as decomposition products of biomasses or generated as other waste.

The ratio of biomass to water in a hydrothermal carbonization depends on the type of the starting substance. When using glucose which dissolves in water a high weight fraction of glucose may be employed. When using green waste or other solid insoluble starting substances the ratio is advantageously chosen such that the starting substance is at least wetted with water.

Hydrothermal carbonization is preferably performed at a temperature of 150° C. to 300° C., particularly preferably 130° C. to 250° C., very particularly preferably 210° C. to 230° C., for example 220° C. As a result, and, depending on the volume of the mixture in the autoclave, an elevated pressure is produced which corresponds to the vapor pressure of water at the relevant temperature. A pressure of 2 to 20 bar is preferred and of 8 to 20 bar is particularly preferred. The reaction preferably proceeds over a period of 30 minutes to 72 hours, particularly preferably 1 to 12 hours, very particularly preferably 3 to 5 hours, for example 4 hours. If the reaction time is excessively short no char is obtained. If the reaction time is excessively long the process is ecologically and economically less advantageous.

As already mentioned, the hydrothermal carbonization is carried out in a pressure- and heat-resistant apparatus, for example in an autoclave. The process of hydrothermal carbonization may also be carried out continuously or discontinuously (for example using an autoclave).

The produced HTC char is preferably worked up. This comprises especially washing with water, drying and comminution, for example by pestling. Suitable process steps and apparatuses in this regard are known to those skilled in the art.

The rubber mixture according to the invention preferably contains 5 to 100 phr of at least one HTC char and a mixture of two or more HTC chars is also conceivable. In a particularly preferred embodiment of the invention the rubber mixture contains 30 to 80 phr, very particularly preferably 30 to 70 phr, preferably in turn 35 to 65 phr, particularly preferably in turn 45 to 65 phr, of at least one HTC char. Especially when HTC char is present in the rubber mixture in comparatively large amounts, such as 50 to 100 phr, said mixture contains a high proportion of filler from renewable sources and correspondingly little filler from fossil raw materials. However, the amount of HTC char also depends on the particular field of application of the rubber mixture. Vehicle tires typically employ different rubber mixtures having different filler contents in the individual components.

In a further particularly preferred embodiment of the invention the rubber mixture contains 5 to 50 phr, preferably 5 to 30 phr, in turn preferably 5 to 20 phr, of at least one HTC char. Such a rubber mixture is suitable in particular for treads or other components such as the side wall of vehicle tires and to this end preferably additionally comprises 10 to 200 phr of at least one carbon black and/or at least one silica.

In a preferred embodiment of the invention the rubber mixture contains no further reinforcing fillers in addition to the HTC char, in particular 0 phr of carbon black and 0 phr of silica. The reinforcing filler system of this rubber mixture makes it optimized in terms of eco-friendliness and sustainability.

In a further preferred embodiment of the invention the rubber mixture contains at least one further reinforcing filler which is preferably selected from silica and carbon black, wherein a mixture of at least one or more silicas and/or at least one or more carbon blacks may also be present.

In an advantageous development of the invention the rubber mixture contains at least one carbon black in amounts of 5 to 300 phr, preferably 10 to 200 phr, particularly preferably 10 to 100 phr, as a filler.

In a further advantageous development of the invention the rubber mixture contains at least one silica in amounts of 5 to 300 phr, preferably 10 to 200 phr, particularly preferably 10 to 100 phr, as a filler.

In a further advantageous development of the invention the rubber mixture contains at least one silica in amounts of 2 to 300 phr, preferably 20 to 200 phr, particularly preferably 30 to 100 phr, and at least one carbon black in amounts of 5 to 30 phr, preferably 5 to 15 phr, as fillers.

In a further advantageous development of the invention the rubber mixture contains at least one carbon black in amounts of 10 to 300 phr, preferably 10 to 200 phr, particularly preferably 30 to 100 phr, and at least one silica in amounts of 5 to 30 phr, preferably 5 to 20 phr, as fillers.

The silicas may be the silicas known to those skilled in the art that are suitable as fillers for tire rubber mixtures. However, particular preference is given to using a finely divided, precipitated silica which has a nitrogen surface area (BET surface area) (in accordance with DIN ISO 9277 and DIN 66132) of 35 to 350 $m^2/g$, preferably of 35 to 260 $m^2/g$, particularly preferably of 70 to 235 $m^2/g$ and very particularly preferably of 70 to 205 $m^2/g$, and a CTAB surface area (in accordance with ASTM D 3765) of 30 to 400 $m^2/g$, preferably of 30 to 255 $m^2/g$, particularly preferably of 65 to 230 $m^2/g$ and very particularly preferably of 65 to 200 $m^2/g$. Such silicas result, for example in rubber mixtures for inner tire components, in particularly good physical properties of the vulcanizates. Advantages in mixture processing by way of a reduction in mixing time can also result here while retaining the same product properties, which lead to improved productivity. Examples of silicas can thus include not only those of the Ultrasil® VN3 (trade name) type from Evonik but also silicas having a comparatively low BET surface area (such as for example Zeosil® 1115 or Zeosil® 1085 from Solvay) and highly dispersible silicas, so-called HD silicas (for example Zeosil® 1165 MP from Solvay).

If the rubber mixture according to the invention comprises carbon black it is preferable to employ a carbon black having an iodine adsorption number according to ASTM D 1510 of 30 g/kg to 250 g/kg, preferably 30 to 180 g/kg, particularly preferably 40 to 180 g/kg and very particularly preferably 40 to 130 g/kg and a DBP number according to ASTM D 2414 of 60 to 200 mL/100 g, preferably 70 to 200 mL/100 g, particularly preferably 90 to 150 mL/100 g.

The rubber mixture according to the invention may further contain additional optionally reinforcing fillers, for example graphite and graphene and so-called "carbon-silica dual-phase fillers" or for example carbon nanotubes (CNT) (including discrete CNTs, so-called hollow carbon fibers (HCF) and modified CNTs containing one or more functional groups, such as hydroxyl, carboxyl and carbonyl groups).

The rubber mixture according to the invention may further comprise non-reinforcing fillers. In the context of the present invention non-reinforcing fillers include aluminosilicates, kaolin, chalk, starch, magnesium oxide, titanium dioxide, or rubber gels and also fibers (such as for example aramid fibers, glass fibers, carbon fibers, cellulose fibers). In the context of the present invention zinc oxide is not included among the fillers.

The rubber mixture according to the invention contains at least one diene rubber. Diene rubbers are rubbers that are formed by polymerization or copolymerization of dienes and/or cycloalkenes and thus have C=C double bonds either in the main chain or in the side groups. The at least one further diene rubber is preferably selected from the group consisting of natural polyisoprene (NR) and/or synthetic polyisoprene (IR) and/or epoxidized polyisoprene and/or butadiene rubber (BR) and/or butadiene-isoprene rubber and/or solution-polymerized styrene-butadiene rubber (SSBR) and/or emulsion-polymerized styrene-butadiene rubber (ESBR) and/or styrene-isoprene rubber and/or liquid rubbers having a molecular weight $M_w$ of greater than 20 000 g/mol and/or halobutyl rubber and/or polynorbornene and/or isoprene-isobutylene copolymer and/or ethylene-propylene-diene rubber and/or nitrile rubber and/or chloroprene rubber and/or acrylate rubber and/or fluoro rubber and/or silicone rubber and/or polysulfide rubber and/or epichlorohydrin rubber and/or styrene-isoprene-butadiene terpolymer and/or hydrogenated acrylonitrile-butadiene rubber and/or hydrogenated styrene-butadiene rubber.

Nitrile rubber, hydrogenated acrylonitrile-butadiene rubber, chloroprene rubber, butyl rubber, halobutyl rubber or ethylene-propylene-diene rubber in particular are used in the production of technical rubber articles, such as belts, drive belts and hoses, and/or shoe soles. The mixture compositions known to those skilled in the art for these rubbers, which are specific in terms of fillers, plasticizers, vulcanization systems and additives, are preferably employed.

The rubber mixture is suitable in particular for vehicle tires and may in principle be used in any component, such as in particular the tread, the sidewall, the flange profile, and also in other so-called body components.

To this end the diene rubber is preferably selected from the group consisting of synthetic polyisoprene (IR) and natural polyisoprene (NR) and styrene-butadiene rubber (SBR) and polybutadiene (BR) and butyl rubber (IIR) and halobutyl rubber. The diene rubber is particularly preferably selected from the group consisting of synthetic polyisoprene (IR) and natural polyisoprene (NR) and styrene-butadiene rubber (SBR) and polybutadiene (BR) which results in particularly good properties in respect of the requirements in the vehicle tire.

In an advantageous embodiment of the invention the rubber mixture contains 50 to 100 phr of at least one styrene-butadiene rubber (SBR), preferably SSBR. In an advantageous embodiment of the invention the rubber mixture contains 5 to 50 phr, preferably 10 to 40 phr, for example 10 to 30 phr, of at least one styrene-butadiene rubber, preferably SSBR.

In a further advantageous embodiment of the invention the rubber mixture contains 5 to 100 phr, preferably 5 to 50 phr, particularly preferably 5 to 40 phr, for example 10 to 30 phr, of at least one butadiene rubber (BR).

In a further advantageous embodiment of the invention the rubber mixture contains 50 to 100 phr of at least one natural rubber (NR).

The recited embodiments of the rubbers make it possible to employ comparatively large amounts of HTC char of 30 to 100 phr/preferred amounts, see above, while providing sustainability-optimized rubber mixtures for vehicle tires.

Not only natural polyisoprene (NR, natural rubber) but also synthetic polyisoprene (IR) may be in the form of both cis-1,4-polyisoprene or 3,4-polyisoprene. However, the use of cis-1,4-polyisoprenes having a cis-1,4 proportion of >90% by weight is preferred. Such a polyisoprene is firstly obtainable by stereospecific polymerization in solution with Ziegler-Nana catalysts or using finely divided lithium alkyls. Secondly, natural rubber (NR) is one such cis-1,4-polyisoprene; the cis-1,4 content in the natural rubber is greater than 99% by weight. A mixture of one or more natural polyisoprenes with one or more synthetic polyisoprenes is further also conceivable.

If the rubber mixture according to the invention contains butadiene rubber (i.e. BR, polybutadiene) any of the types known to those skilled in the art may be concerned. These include inter alia the so-called high-cis and low-cis types, wherein polybutadiene having a cis content of not less than 90% by weight is referred to as high-cis type and polybutadiene having a cis content of less than 90% by weight is referred to as low-cis type. An example of a low-cis polybutadiene is Li—BR (lithium-catalyzed butadiene rubber) having a cis content of 20% to 50% by weight. Particularly good abrasion properties and low hysteresis of the rubber mixture are achieved with a high-cis BR.

The polybutadiene(s) employed may be end group-modified with modifications and functionalizations and/or be functionalized along the polymer chains. The modification may be selected from modifications with hydroxyl groups and/or ethoxy groups and/or epoxy groups and/or siloxane groups and/or amino groups and/or aminosiloxane and/or carboxyl groups and/or phthalocyanine groups and/or silane-sulfide groups. However, other modifications known to those skilled in the art, also known as functionalizations, are also suitable. Metal atoms may be a constituent of such functionalizations.

In the case where at least one styrene-butadiene rubber (styrene-butadiene copolymer) is present in the rubber mixture this may be selected from solution-polymerized styrene-butadiene rubber (SSBR) and emulsion-polymerized styrene-butadiene rubber (ESBR), a mixture of at least one SSBR and at least one ESBR also being employable. The terms "styrene-butadiene rubber" and "styrene-butadiene copolymer" are used synonymously in the context of the present invention. The styrene-butadiene copolymer used may be end group-modified and/or functionalized along the polymer chains with the modifications and functionalizations recited above for the polybutadiene.

In the case where silica is present in the rubber mixture a preferred embodiment provides that the rubber mixture contains at least one silane coupling agent. In the context of the present invention silane coupling agents are also referred to as "silane". One or more different silane coupling agents may be used in combination with one another. The rubber mixture may thus contain a mixture of different silanes. The silane coupling agents react with the surface silanol groups of the silica or other polar groups during the mixing of the rubber/the rubber mixture (in situ) or in the context of a pretreatment (premodification) even before addition of the filler to the rubber. Employable silane coupling agents include any silane coupling agents known to those skilled in the art for use in rubber mixtures.

Such coupling agents known from the prior art are bifunctional organosilanes having at least one alkoxy, cycloalkoxy or phenoxy group as a leaving group on the silicon atom and having as another functionality a group which, possibly after cleavage, can enter into a chemical reaction with the double bonds of the polymer. The latter group may for example be the following chemical groups:

—SCN, —SH, —NH$_2$ or —S$_X$ (with x=2 to 8).

Employable silane coupling agents thus include for example 3-mercaptopropyltriethoxysilane, 3-thiocyanatopropyltrimethoxysilane or 3,3'-bis(triethoxysilylpropyl) polysulfides having 2 to 8 sulfur atoms, for example 3,3'-bis(triethoxysilylpropyl) tetrasulfide (TESPT), the corresponding disulfide (TESPD), or else mixtures of the sulfides having 1 to 8 sulfur atoms with different contents of the various sulfides. TESPT may for example also be added as a mixture with carbon black (trade name X505® from Evonik).

It is preferable to employ a silane mixture which contains 40% to 100% by weight of disulfides, particularly preferably 55% to 85% by weight of disulfides and very particularly preferably 60% to 80% by weight of disulfides. Such a mixture is obtainable for example from Evonik under the trade name Si 266® which is described in DE 102006004062 A1 for example.

Blocked mercaptosilanes as known for example from WO 99/09036 may also be used as a silane coupling agent. Silanes as are described in WO 2008/083241 A1, WO 2008/083242 A1, WO 2008/083243 A1 and WO 2008/083244 A1 can also be used. Usable silanes are for example those marketed under the name NXT (e.g. 3-(octanoylthio)-1-propyltriethoxysilane) in a number of variants by Momentive, USA, or those marketed under the name VP Si 363® by Evonik Industries.

It is also conceivable to use one of the abovementioned mercaptosilanes, especially 3-mercaptopropyltriethoxysilane, in combination with processing aids (listed below), especially PEG carboxylates. In a preferred embodiment of the invention the rubber mixture contains a combination of 3-mercaptopropyltriethoxysilane and PEG carboxylates which results in particularly good properties, especially with regard to the technical object to be achieved, and a good overall level for the other properties.

In an advantageous development of the invention the rubber mixture contains at least one silane. This achieves advantageous physical properties for the sustainability-optimized rubber mixture.

In a further advantageous development of the invention the rubber mixture is free from silane coupling agents. This makes it possible to achieve an elevated stress-strain curve, especially compared to a mixture containing the carbon black N 660 instead of HTC char.

The rubber mixture may also contain further activators and/or agents for binding fillers, in particular carbon black. This may be, for example, the compound S-(3-aminopropyl) thiosulfuric acid disclosed in EP 2589619 A1 for example and/or metal salts thereof, whereby very good physical properties of the rubber mixture, especially in combination with at least one carbon black as filler, are achieved.

It is possible for 0 to 100 phr, preferably 0.1 to 80 phr, more preferably 0.1 to 70 phr and most preferably 0.1 to 50 phr of at least one plasticizer to be present in the rubber mixture. The plasticizers used in the context of the present invention include all the plasticizers that are known to those skilled in the art, such as aromatic, naphthenic or paraffinic mineral oil plasticizers, for example MES (mild extraction solvate) or RAE (residual aromatic extract) or TDAE (treated distillate aromatic extract), or rubber-to-liquid oils (RTL) or biomass-to-liquid oils (BTL) preferably having a content of polycyclic aromatics of less than 3% by weight according to method IP 346 or triglycerides, for example rapeseed oil, or factices or hydrocarbon resins or liquid polymers having a mean molecular weight (determination by GPC=gel permeation chromatography, in accordance with BS ISO 11344:2004) between 500 and 20 000 g/mol. If additional liquid polymers are used as plasticizers in the rubber mixture according to the invention these are not included as rubber in the calculation of the composition of the polymer matrix. The plasticizer is preferably selected from the group consisting of the abovementioned plasticizers. It is particularly preferable when the plasticizer is selected from the group consisting of hydrocarbon resins, liquid polymers and mineral oils.

When using mineral oil this is preferably selected from the group consisting of DAE (distilled aromatic extracts) and/or RAE (residual aromatic extract) and/or TDAE (treated distilled aromatic extracts) and/or MES (mild extracted solvents) and/or naphthenic oils. In a preferred embodiment of the invention the rubber mixture contains at least one mineral oil plasticizer, preferably at least TDAE and/or RAE, as a plasticizer. This results in particularly good processability characteristics, in particular a good miscibility of the rubber mixture. In a preferred embodiment of the invention the rubber mixture comprises at least one liquid polymer as a plasticizer. In a preferred embodiment of the invention the rubber mixture comprises at least one hydrocarbon resin as a plasticizer.

It will be clear to those skilled in the art that hydrocarbon resins are polymers constructed from monomers, wherein the hydrocarbon resin is formally constructed from derivatives of the monomers by linkage of the monomers to one another. However, these hydrocarbon resins do not count as rubbers in the context of the present invention. In the context of the present application the term "hydrocarbon resins" comprises resins comprising carbon atoms and hydrogen atoms and optionally heteroatoms, such as especially oxygen atoms. The hydrocarbon resin may be a homopolymer or a copolymer. In the present application the term "homopolymer" is to be understood as meaning a polymer which, according to Rompp Online Version 3.28, "has formed from monomers of only one type". The monomers may be any monomers of hydrocarbon resins that are known to those skilled in the art, such as aliphatic $C_5$ monomers, further unsaturated compounds capable of cationic polymerization containing aromatics and/or terpenes and/or alkenes and/or cycloalkenes. In a preferred embodiment of the invention the hydrocarbon resin is selected from the group consisting of aliphatic $C_5$ resins and hydrocarbon resins formed from alpha-methylstyrene and styrene. The hydrocarbon resin preferably has an ASTM E 28 (ring and ball) softening point of 10° C. to 180° C., particularly preferably of 60° C. to 150° C., very particularly preferably of 80° C. to 99° C. Furthermore, the hydrocarbon resin preferably has a molecular weight Mw of 500 to 4000 g/mol, preferably of 1300 to 2500 g/mol.

The rubber mixture can further comprise customary additives in customary weight fractions which during the production of said mixture are added preferably in at least one primary mixing stage. These additives include a) aging stabilizers, such as for example N-phenyl-N'-(1,3-dimethylbutyl)-p-phenylenediamine (6PPD), N,N'-diphenyl-p-phenylenediamine (DPPD), N,N'-ditolyl-p-phenylenediamine (DTPD), N-isopropyl-N'-phenyl-p-phenylenediamine (IPPD), 2,2,4-trimethyl-1,2-dihydroquinoline (TMQ), b) activators, such as for example zinc oxide and fatty acids (e.g. stearic acid) and/or other activators, such as zinc complexes, for example zinc ethylhexanoate, c) waxes, d) hydrocarbon resins not already comprised as plasticizers, e) masticating aids, such as for example 2,2'-dibenzamidodiphenyl disulfide (DBD), and f) processing aids, such as in particular fatty acid esters and metal soaps, for example zinc soaps and/or calcium soaps.

The total amount of further additives is 3 to 150 phr, preferably 3 to 100 phr and particularly preferably 5 to 80 phr.

Zinc oxide (ZnO) may be included in the overall proportion of the further additives. This may be any type of zinc oxide known to those skilled in the art, such as for example ZnO granules or powder. The zinc oxide conventionally used generally has a BET surface area of less than 10 m$^2$/g. However, it is also possible to use a zinc oxide having a BET surface area of 10 to 100 m$^2$/g, for example so-called "nano zinc oxides".

The vulcanization of the sulfur-crosslinkable rubber mixture is preferably performed in the presence of sulfur or sulfur donors with the aid of vulcanization accelerators, wherein some vulcanization accelerators may simultaneously act as sulfur donors. Sulfur or sulfur donors and one or more accelerators are added in the stated amounts to the rubber mixture in the last mixing step. The accelerator is selected from the group consisting of thiazole accelerators and/or mercapto accelerators and/or sulfenamide accelerators and/or thiocarbamate accelerators and/or thiuram accelerators and/or thiophosphate accelerators and/or thiourea accelerators and/or xanthogenate accelerators and/or guanidine accelerators. It is preferable to use a sulfenamide accelerator selected from the group consisting of N-cyclohexyl-2-benzothiazolesulfenamide (CBS) and/or N,N-dicyclohexylbenzothiazole-2-sulfenamide (DCBS) and/or benzothiazyl-2-sulfenomorpholide (MBS) and/or N-tert-butyl-2-benzothiazylsulfenamide (TBBS). It is particularly preferable to use the accelerators TBBS and/or CBS and/or diphenylguanidine (DPG).

Vulcanization retarders may also be present in the rubber mixture.

The sulfur donor substances used may be any sulfur-donating substances known to those skilled in the art. If the rubber mixture comprises a sulfur-donating substance the latter is preferably selected from the group comprising for example thiuram disulfides, for example tetrabenzylthiuram disulfide (TBzTD) and/or tetramethylthiuram disulfide (TMTD) and/or tetraethylthiuram disulfide (TETD), and/or thiuram tetrasulfides, for example dipentamethylenethiuram tetrasulfide (DPTT), and/or dithiophosphates, for example DipDis (bis(diisopropyl)thiophosphoryl disulfide) and/or bis (O,O-2-ethylhexylthiophosphoryl) polysulfide (e.g. Rhenocure SDT 50®, Rheinchemie GmbH) and/or zinc dichloryl-dithiophosphate (e.g. Rhenocure ZDT/S®, Rheinchemie GmbH) and/or zinc alkyldithiophosphate, and/or 1,6-bis(N,N-dibenzylthiocarbamoyldithio)hexane and/or diaryl polysulfides and/or dialkyl polysulfides.

The terms "vulcanized" and "crosslinked" are used synonymously in the context of the present invention.

Production of the rubber mixture according to the invention is carried out by the process customary in the rubber industry comprising initially producing in one or more mixing stages a primary mixture comprising all constituents except constituents of the vulcanization system such as sulfur and vulcanization accelerators. The at least one HTC char may be admixed in the same way as carbon blacks. The finished mixture is produced by adding the vulcanization system in a final mixing stage. The finished mixture is processed further, for example, by an extrusion operation and converted to the appropriate shape.

The present invention further provides a vulcanizate obtained by sulfur vulcanization of at least one rubber mixture according to the invention including all described embodiments. Vulcanization is carried out under conditions known to those skilled in the art and using known apparatuses.

The present invention further provides a vehicle tire which comprises at least one vulcanizate according to the invention in at least one component. The vehicle tire according to the invention may contain different embodiments of the rubber mixture according to the invention in different components. It is particularly preferable when it comprises the vulcanizate at least in the sidewall and/or in the flange profile and/or an internal component. The internal components of a tire are to be understood as including inter alia interlayers, inner liner, core profile, belt, shoulder strips, belt profile, carcass, bead reinforcement and bead profile. Particularly for the recited components the carbon blacks present may be replaced in comparatively large amounts, in particular 10 to 100 phr, for example 10 to 60 phr, or entirely by HTC char. The vehicle tire according to the invention may also comprise the vulcanizate in the tread.

The rubber mixture according to the invention is further also suitable for other technical rubber articles, such as bellows, conveyor belts, air springs, belts, drive belts or hoses and also footwear soles and, due to the profile of requirements, especially for conveyor belts.

Production of the vehicle tire according to the invention is carried out as known in the prior art. In particular the individual components are correspondingly premolded in an unvulcanized state and applied to the green tire which is then subsequently vulcanized.

The invention shall now be more particularly elucidated with reference to comparative and working examples which are described and summarized in the following tables and figures. Produced HTC chars are summarized in tables 1 to 4 wherein the starting substance (also known as the substrate), temperature (T) and time (t) and the addition of different salts are varied. The salts were first provided as aqueous solutions and employed. The chars in table 1 were produced in an autoclave having a capacity of 200 mL and the weight ratio of salt to starting substance was in each case 2.5 to 1.

The chars in table 2 and 3 were produced in an autoclave having a capacity of 2 L, wherein the weight ratio of salt to starting substance was in each case 1.2 to 1. In table 4 the weight ratio of salt to starting substance is varied and the chars were likewise produced in an autoclave having a capacity of 2 L.

Reported in respect of the chars in each case are the carbon content—determined by elemental analysis—and the BET surface area (BET surface area according to DIN ISO 9277, calculation by Brunauer-Emmett-Teller (BET) isotherm).

TABLE 1

| Char no. | Starting substance | Salt | T °C. | t h | Yield % | Carbon content % by wt. | BET $m^2/g$ |
|---|---|---|---|---|---|---|---|
| 1 | Biomass[a] | — | 180 | 12 | 45 | 57 | 7 |
| 2 | Biomass[a] | KCl/ZnCl$_2$ | 180 | 12 | 60 | 65 | 52 |
| 3 | Biomass[a] | — | 220 | 12 | 67 | 71 | 10 |
| 4 | Biomass[a] | — | 220 | 24 | 23 | 72 | 6 |
| 5 | Coconut husk[b] | — | 220 | 12 | 49 | 70 | n. d. |
| 6 | Biomass[a] | KCl/ZnCl$_2$ | 220 | 24 | 44 | 68 | 31 |
| 7 | Coconit 300[c] | ZnCl$_2$ | 180 | 12 | 42 | 65 | 131 |
| 8 | Rice husk[d] | ZnCl$_2$ | 180 | 12 | 39 | 52 | 135 | n.d. = not determinable

TABLE 2

| Char no. | Starting substance | Salt | T °C. | t h | Yield % | Carbon content % by wt. | BET $m^2/g$ |
|---|---|---|---|---|---|---|---|
| 9 | Glucose[e] | — | 180 | 12 | 37 | 62 | n. d. |
| 10 | Glucose[e] | ZnCl$_2$ | 180 | 12 | 45 | 65 | 125 |
| 11 | Cellulose[f] | — | 180 | 12 | 51 | 51 | 10 |
| 12 | Cellulose[f] | ZnCl$_2$ | 180 | 12 | 48 | 64 | 104 |
| 13 | Rice husk[d] | — | 180 | 12 | 63 | 45 | 11 |
| 14 | Rice husk[d] | ZnCl$_2$ | 180 | 12 | 60 | 48 | 65 |
| 15 | Coconit[c] | — | 180 | 12 | 61 | 60 | 4 |
| 16 | Coconit[c] | ZnCl$_2$ | 180 | 12 | 52 | 67 | 98 |

TABLE 3

| Char no. | Salt | T °C. | t h | Yield % | Carbon content % by wt. | BET $m^2/g$ |
|---|---|---|---|---|---|---|
| 17 | — | 180 | 4 | 56 | 58 | 3 |
| 18 | ZnCl$_2$ | 180 | 4 | 54 | 67 | 98 |
| 19 | — | 180 | 12 | 61 | 60 | 4 |
| 20 | ZnCl$_2$ | 180 | 12 | 52 | 67 | 98 |
| 21 | — | 180 | 20 | 55 | 58 | 8 |
| 22 | ZnCl$_2$ | 180 | 20 | 56 | 67 | 103 |
| 23 | — | 220 | 20 | 49 | 69 | 52 |
| 24 | ZnCl$_2$ | 220 | 20 | 50 | 70 | 135 |
| 25 | — | 220 | 36 | 48 | 69 | 44 |
| 26 | ZnCl$_2$ | 220 | 36 | 50 | 70 | 186 |
| 27 | — | 200 | 12 | 48 | 67 | 50 |
| 28 | ZnCl$_2$ | 200 | 12 | 47 | 68 | 112 |

TABLE 3-continued

| Char no. | Salt | T °C. | t h | Yield % | Carbon content % by wt. | BET m²/g |
|---|---|---|---|---|---|---|
| 29 | — | 220 | 12 | 49 | 68 | 51 |
| 30 | ZnCl₂ | 220 | 12 | 47 | 69 | 118 |
| 31 | LiCl | 180 | 12 | 53 | 68 | 24 |
| 32 | LiCl/ZnCl₂ | 180 | 12 | 52 | 68 | 68 |
| 33 | KCl | 180 | 12 | 56 | 66 | 34 |
| 34 | KCl/ZnCl₂ | 180 | 12 | 54 | 68 | 50 |
| 35 | NaCl | 180 | 12 | 57 | 67 | 37 |
| 36 | NaCl/ZnCl₂ | 180 | 12 | 52 | 68 | 50 |

In table 3 Coconit 300$^{c)}$ was used as the starting substance.

TABLE 4

| Char no. | Salt to start. sub. wt. ratio | T °C. | t h | Yield % | Carbon content % by wt. | BET m²/g |
|---|---|---|---|---|---|---|
| 37 | 0.2:1 | 180 | 12 | 51 | 68 | 49 |
| 38 | 0.4:1 | 180 | 12 | 51 | 66 | 55 |
| 39 | 0.8:1 | 180 | 12 | 52 | 69 | 66 |
| 40 | 1.2:1 | 180 | 12 | 52 | 67 | 98 |
| 41 | 1.8:1 | 180 | 12 | 53 | 66 | 21 |

In table 4 Coconit 300$^{c)}$ was used as the starting substance and ZnCl₂ was used as the salt.

Substances Used
a) Biomass: Mixture of grass and rushes from green wastes from the area to the northeast of Oldenburg. Contains around 70% of common rushes (Juncus effusus), 25-30% of grasses (Poaceae, Cyperaceae) and smaller amounts and traces of herbs. The different grasses and rushes were used already mixed and comminuted to afford particles having a size of about 0.2 mm.
b) Coconut husk: Coconut husk granulates of less than 1 inch in size from Mahlwerk Neubauer-Friedrich Geffers GmbH
c) Coconit 300: Coconut husk flour from Mahlwerk Neubauer-Friedrich Geffers GmbH
d) Rice husks: from Kazulube
e) Glucose: D(+)-Glucose anhydrous, VWR
f) Cellulose: α-cellulose powder ("powder"), Sigma Aldrich An HTC char produced using at least one salt has an increased surface roughness and an optimized surface functionality. The surface roughness may be qualitatively assessed using TEM images by way of comparison as shown for example in FIGS. 1 and 2.

Figure 1:
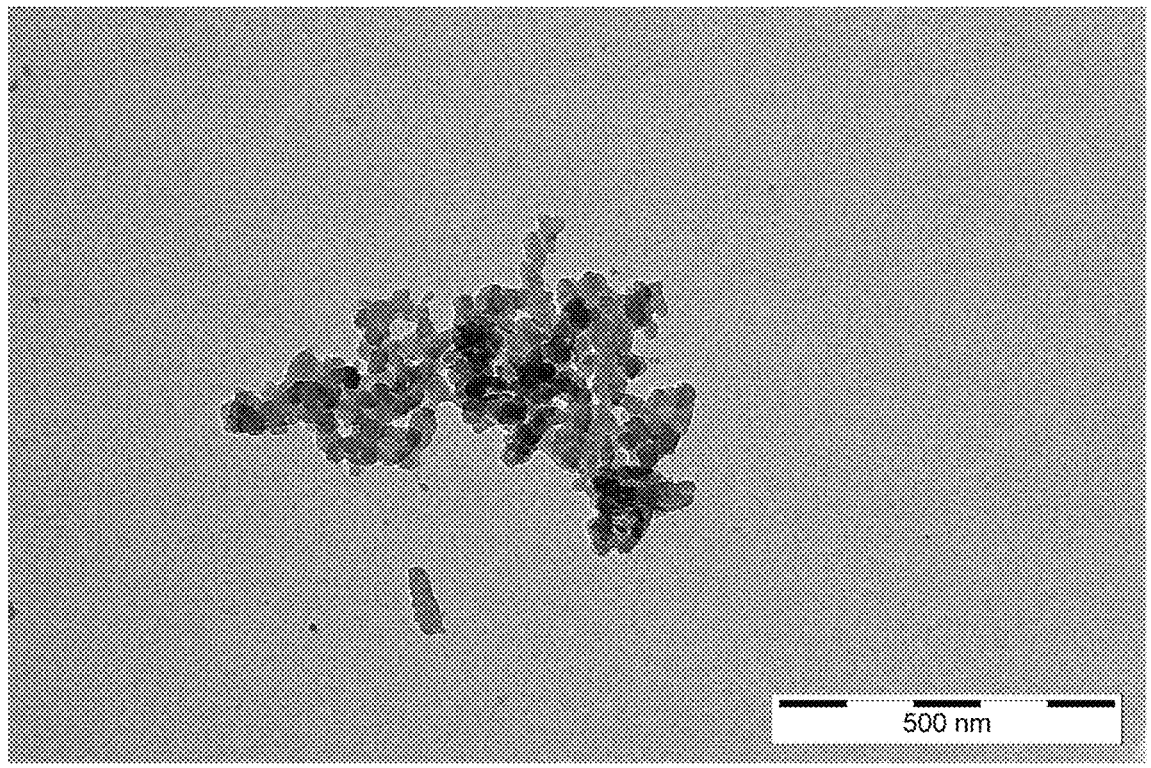
FIG. 1 shows an HTC char produced using the salt mixture ZnCl₂/KCl (reaction at 180° C. for 12 hours).
Figure 2:
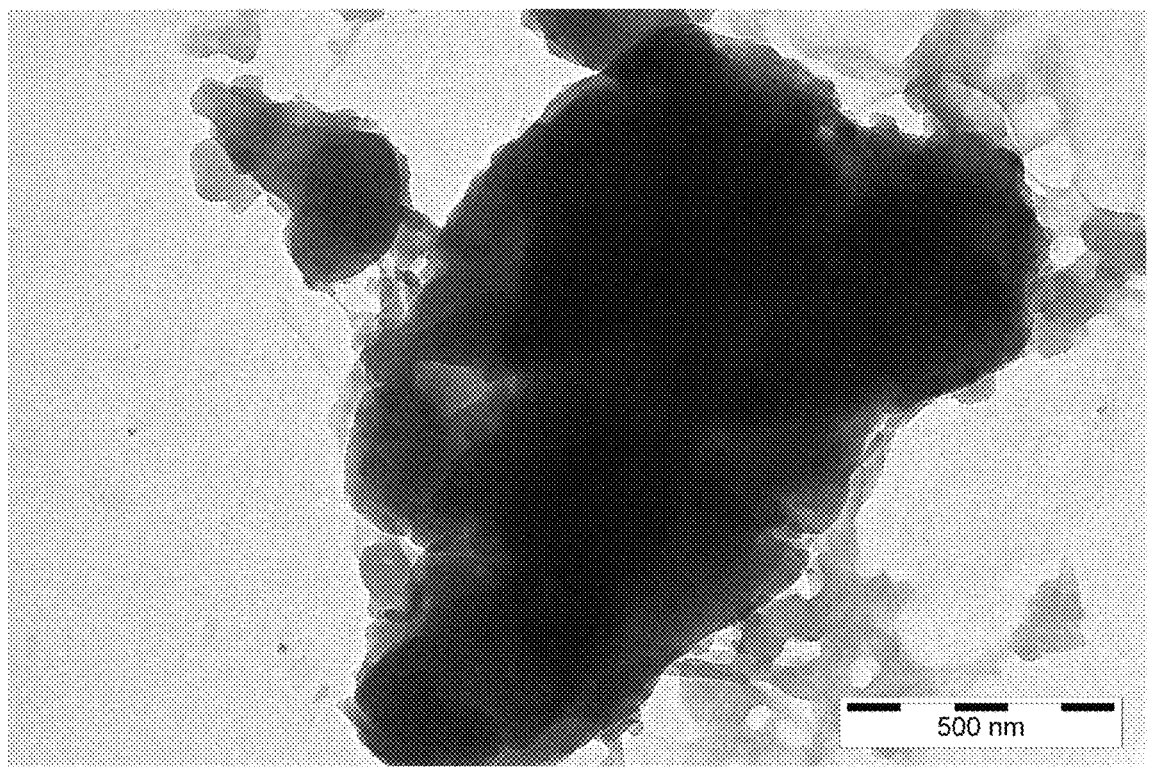
FIG. 2 shows a char produced without using the salt mixture under otherwise identical conditions (reaction at 180° C. for 12 hours).

As is apparent from the comparison of FIG. 1 and FIG. 2 the HTC char produced using at least one salt has a higher roughness.

Figure 3:
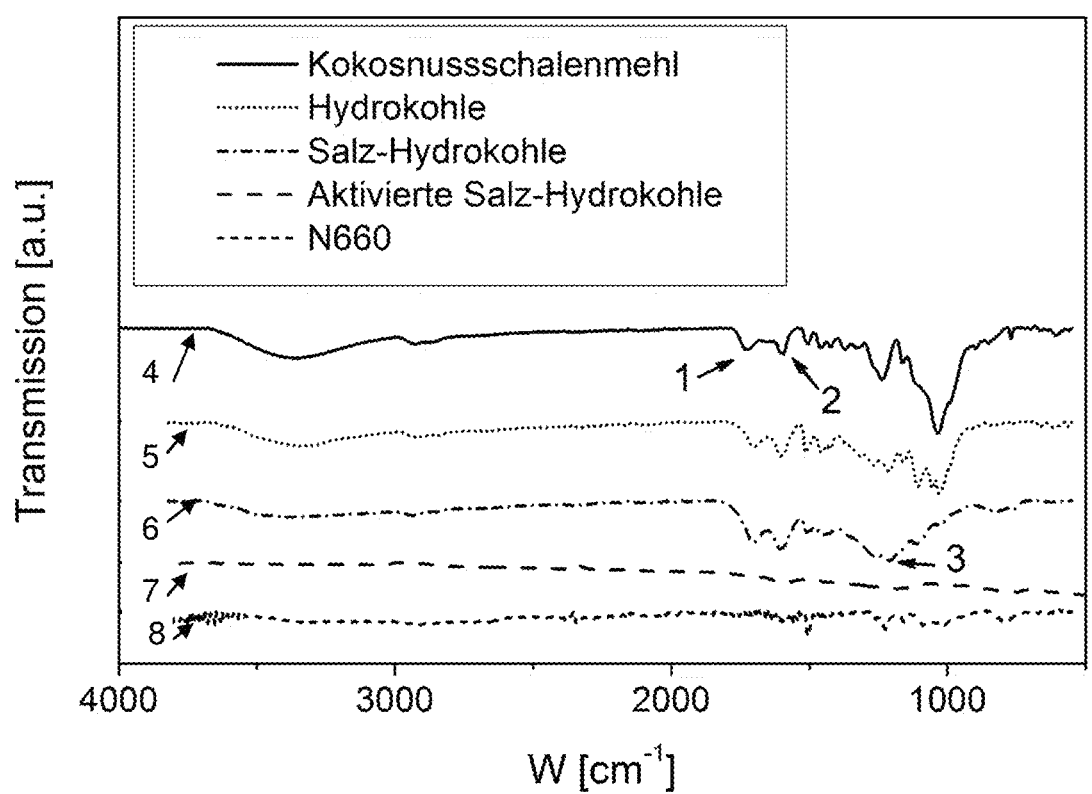

FIG. 3 is an exemplary FTIR spectrum. Here, transmission is plotted qualitatively (units: a.u.=arbitrary units) against wavenumber (W for short) (units: cm⁻¹).

The spectra and their relevant sections are shown for the following substances:
for the starting substance coconut husk flour 4;
for a hydrochar 5 produced by hydrothermal carbonization of coconut husk flour (reaction at 180° C. for 12 hours) without salt
for a salt hydrochar 6 produced using the salt ZnCl₂ but otherwise identical conditions (reaction at 180° C. for 12 hours; coconut husk flour);
for an activated salt hydrochar 7 produced using the salt mixture LiCl/ZnCl₂ (reaction at 180° C. for 12 hours; coconut husk flour) and subsequent activation by water vapor at 500° C. for 1 hour;
for carbon black N 660 8.

It is apparent in FIG. 3 that a salt hydrochar 6 still comprises functional groups compared to a salt hydrochar 7 activated in a further step, as is apparent from the bands for carbonyl compounds 1 and the bands for oxygen-containing functional groups 3. The char produced with salt simultaneously exhibits bands for C=C double bonds 2 in the FTIR spectrum. The spectrum for the carbon black 8 also exhibits bands for oxygen-containing functional groups 3 and for C=C double bonds 2 and the salt hydrochar 6 is therefore chemically at least similar to carbon blacks. The salt hydrochar thus has functional groups which may possibly result in increased interactions in a rubber mixture. Compared to hydrochar (without salt) 5 it is apparent that while use of the salt causes part of the functionality to be lost and only the above described groups to be retained the band for oxygen-containing functional groups 3 is actually stronger in the salt hydrochar 6.

It is further conceivable that the loss of the potentially disruptive groups results in improved interactivity of the salt hydrochar in a rubber mixture.

The HTC chars summarized in table 1 were incorporated into rubber mixtures whose general formulations are shown in table 5. When choosing the chars the focus was on sustainability for economic reasons and several waste biomasses were therefore selected as starting substances. The mixtures labeled "E" are mixtures according to the invention which contain at least one HTC char as a filler while the mixtures marked with "V" are comparative mixtures containing carbon black as a filler.

The mixture was produced according to the process customary in the rubber industry under standard conditions in three stages in a laboratory mixer having a volume of 300 milliliters to 3 liters wherein initially in the first mixing stage (preliminary mixing stage) all constituents apart from the vulcanization system (sulfur and vulcanization influencers) were mixed at 145° C. to 165° C., target temperatures of 152° C. to 157° C., for 200 to 600 seconds. This preliminary mixture was mixed again in a further step. Addition of the vulcanization system in the third stage (final mixing stage) afforded the final mixture, mixing being carried out at 90° C. to 120° C. for 180 to 300 seconds.

All mixtures were used to produce test specimens by vulcanization and these test specimens were used to determine material properties typical for the rubber industry and these are summarized in tables 6 and 7. The tests described above were carried out on test samples using the following test methods:
Archimedes density
Shore A hardness at room temperature RT and 70° C. using a durometer according to ISO 868
Rebound resilience at RT and 70° C. according to ISO 4662
Stress values at 50% and 100% strain at room temperature according to ISO 37 and ASTM D 412 (M50 and M100)

TABLE 5

| Constituents | Units | V1 | E1-E8 | V2 | E9-E16 |
|---|---|---|---|---|---|
| SSBR $^{g)}$ | phr | 100 | 100 | 100 | 100 |
| Carbon black N 660 | phr | 60 | — | 40 | — |

TABLE 5-continued

| Constituents | Units | V1 | E1-E8 | V2 | E9-E16 |
|---|---|---|---|---|---|
| Char-varies [h] | phr | — | 60 | — | 40 |
| TDAE oil | phr | 3 | 3 | 3 | 3 |
| Other additives [i] | phr | 11 | 11 | 11 | 11 |
| TBBS accelerator | phr | 0.7 | 0.7 | 0.7 | 0.7 |
| Sulfur | phr | 1.7 | 1.7 | 1.7 | 1.7 |

Substances Used g) SSBR: Nipol NS 210R, Zeon Europe GmbH
h) chars from table 1; as reported in tables 6 to 9, in each case in the reported amounts of 60 or 40 phr
i) aging stabilizers, antiozonant wax, zinc oxide, stearic acid As is apparent from tables 6 and 7 carbon black (N 660) (mixtures V1 and V2) may be completely substituted by HTC chars, the reduced rebound resiliences resulting in improved room-temperature wet grip indicators, especially for use in vehicle tires. Stiffness (values for M50 and M100 hardnesses) and thus the handling indicators and rebound resilience at 70° C. remain at a comparable level acceptable for use in vehicle tires. In addition, the rubber mixtures according to the invention show a reduced density compared to the respective comparative mixtures which in turn results in lighter and thus rolling resistance-optimized components for vehicle tires.

TABLE 6

| | | V1 | E1 | E2 | E3 | E4 | E5 | E6 | E7 | E8 |
|---|---|---|---|---|---|---|---|---|---|---|
| | | | | | Char no. from tab. 1 | | | | | |
| Properties | Units | — | 1 | 2 | 3 | 4 | 5 | 6 | 7 | 8 |
| Density | g/cm³ | 1.16 | 1.07 | 1.07 | 1.06 | 1.05 | 1.07 | 1.06 | 1.08 | 1.09 |
| Hardness RT | Shore A | 62.1 | 65.7 | 65.0 | 59.2 | 57.0 | 65.4 | 64.1 | 68.2 | 62.8 |
| Hardness 70° C. | Shore A | 58.8 | 59.0 | 59.4 | 52.3 | 47.6 | 56.2 | 55.6 | 62.0 | 56.7 |
| Reb. resil. RT | % | 52.2 | 48.4 | 50.6 | 51.2 | 50.8 | 50.8 | 51.8 | 48.4 | 51.8 |
| Reb. resil. 70° C. | % | 59.4 | 56.0 | 53.6 | 56.2 | 53.2 | 52.0 | 55.2 | 56.4 | 56.4 |
| M50 | MPa | 1.4 | 1.9 | 1.9 | 1.3 | 1.1 | 1.6 | 1.7 | 1.8 | 1.4 |
| M100 | MPa | 2.4 | 2.4 | 3.0 | 1.7 | 1.4 | 2.0 | 2.4 | 2.6 | 1.9 |

TABLE 7

| | | V2 | E9 | E10 | E11 | E12 | E13 | E14 | E15 | E16 |
|---|---|---|---|---|---|---|---|---|---|---|
| | | | | | Char no. from tab. 1 | | | | | |
| Properties | Units | — | 1 | 2 | 3 | 4 | 5 | 6 | 7 | 8 |
| Density | g/cm³ | 1.10 | 1.05 | 1.04 | 1.04 | 1.03 | 1.04 | 1.04 | 1.02 | 1.07 |
| Hardness RT | Sh A | 51.6 | 59.2 | 55.9 | 51.8 | 50.6 | 56.7 | 55.1 | 54.5 | 54.1 |
| Hardness 70° C. | Sh A | 49.3 | 53.6 | 46.8 | 48.2 | 44.6 | 48.6 | 47.9 | 45.2 | 46.5 |
| Rebound resilience RT | % | 53.2 | 52.0 | 55.2 | 54.0 | 54.8 | 54.6 | 55.2 | 53.0 | 56.4 |
| Rebound resilience 70° C. | % | 61.6 | 58.4 | 57.2 | 59.4 | 58.8 | 57.0 | 58.4 | 55.0 | 58.2 |
| M50 | MPa | 1.0 | 1.4 | 1.2 | 1.0 | 0.9 | 1.1 | 1.2 | 1.0 | 1.1 |

As further working examples the hydrochars reported in tables 2 to 4 may furthermore be employed in the rubber mixture according to the invention.

LIST OF REFERENCE NUMERALS (Part of the Description)

1 band for carbonyl compound C=O (in FTIR spectrum)
2 band for C=C double bond (in FTIR spectrum)
3 band for oxygen-containing functional groups —O— (in FTIR spectrum)
4 section of the FTIR spectrum for the starting substance coconut husk flour
5 section of the FTIR spectrum for hydrochar: HTC (12 h, 180° C.)
6 section of the FTIR spectrum for salt hydrochar: HTC (12 h, 180° C.) with zinc chloride
7 section of the FTIR spectrum for activated salt hydrochar: HTC (12 h, 180° C.) with lithium chloride/zinc chloride and activated (1 h, 500° C.) with steam
8 section of the FTIR spectrum for carbon black N 660

The invention claimed is:

1. A sulfur-crosslinkable rubber mixture comprising:
at least one diene rubber, and
at least one hydrothermal carbonized coal produced by hydrothermal carbonization of at least one starting substance,
wherein the at least one hydrothermal carbonized coal has a BET nitrogen surface area according to DIN ISO 9277 of 20 to 200 m²/g;
wherein the at least one hydrothermal carbonized coal is unactivated hydrothermal carbonized coal;
wherein the hydrothermal carbonization is carried out at a temperature of 150° C. to 300° C. and a pressure of 2 bar to 20 bar;
wherein the at least one hydrothermal carbonized coal has a surface functionality;
wherein the sulfur-crosslinkable rubber mixture is free from silane coupling agents; and
wherein at least one metal halide is used in the hydrothermal carbonization.

2. The sulfur-crosslinkable rubber mixture according to claim 1, wherein the at least one metal halide is at least one metal chloride.

3. The sulfur-crosslinkable rubber mixture according to claim 1, wherein the at least one starting substance is a degradation product of at least one biomass.

4. The sulfur-crosslinkable rubber mixture according to claim 1, wherein the at least one starting substance is two starting substances comprising a biomass and a degradation product of the biomass.

5. The sulfur-crosslinkable rubber mixture according to claim 1, wherein the at least one starting substance is selected from the group consisting of lignin, cellulose, hemicellulose and sugar.

6. The sulfur-crosslinkable rubber mixture according to claim 1, wherein the at least one starting substance is glucose.

7. The sulfur-crosslinkable rubber mixture according to claim 1, wherein the sulfur-crosslinkable rubber mixture further comprises 5 to 100 phr of the at least one hydrothermal carbonized coal.

8. The sulfur-crosslinkable rubber mixture according to claim 1, which is incorporated in at least one of side wall, horn profile and inner component of a vehicle, and subjected to sulfur vulcanization.

9. The sulfur-crosslinkable rubber mixture according to claim 1, wherein the surface functionality is functional groups at the surface of the at least one hydrothermal carbonized coal, and the functional groups are carbon-oxygen-containing functional groups, nitrogen, sulfur, and/or halides.

10. The sulfur-crosslinkable rubber mixture according to claim 1, wherein the hydrothermal carbonization is carried out at a temperature of 210° C. to 230° C.

11. The sulfur-crosslinkable rubber mixture according to claim 1, wherein a weight ratio of the at least one metal halide to starting substance is 0.3:1 to 3.0:1.

12. The sulfur-crosslinkable rubber mixture according to claim 1, wherein the sulfur-crosslinkable rubber mixture is devoid of any further reinforcing filler.

13. The sulfur-crosslinkable rubber mixture according to claim 1, wherein the at least one metal halide is at least $ZnCl_2$.

14. The sulfur-crosslinkable rubber mixture according to claim 13, further comprising a salt selected from the group consisting of LiCl, NaCl and KCl.

15. The sulfur-crosslinkable rubber mixture according to claim 1, wherein the at least one starting substance is at least one biomass.

16. The sulfur-crosslinkable rubber mixture according to claim 15, wherein the biomass is selected from the group consisting of cereal husks, nut husks, fruit peels, green waste, wood waste, sawdust, and algae.

* * * * *